United States Patent Office 2,883,309
Patented Apr. 21, 1959

2,883,309

PROCESS FOR THE PRODUCTION OF CEREAL STARCH

Kurt Bernheim, Zurich, Switzerland

No Drawing. Application August 9, 1956
Serial No. 603,178

1 Claim. (Cl. 127—67)

The present invention relates to a process for the separation of cereal starch from cereal flour, e.g. wheat starch from wheat flour.

In previously known processes the commercial cereal flour is washed out with water in so-called extractors. In this way a starch milk is formed which, in addition to the actual starch, also contains sticky residues and particles of raw fibre as impurities. These raw starch milks are hetero-dispersions, i.e. they contain particles ranging in size from a few microns to 100 microns and over. In order to obtain starch free from impurities the raw starch milk is treated in centrifugal separators, in which a separation of the larger from the finer grains in effected. The large grains consist only of starch, which on further treatment yields the so-called best quality starch. The fine grains, however, are more or less a waste product, containing sticky residues and particles of raw fibre in addition to the starch. These impurities are difficult to remove, so that the product is only a second-grade starch of little commercial value.

It is therefore of increasing technical and economic interest to carry out the manufacture of starch so as to form only small amounts of second-grade starch and to obtain large-grained first-quality starch, free from sticky residues and raw fibres, as the main product. It is an object of the present invention to provide means for carrying out a highly economical process in which cereal flour is treated to bring out a considerably increased output or yield in first quality starch.

According to the present invention a process for the production of starch from cereal flour comprises subjecting the flour to pre-treatment by means of centrifuging action to separate the finer particles thereof, and then subjecting the larger particle fraction remaining to aqueous treatment to obtain starch of first quality therefrom. As stated according to the invention the separation of the finer undesirable particles from the flour is effected by a centrifugal preparation. The cereal flour is suspended in a current of air and exposed to centrifugal force. A very sharp separation corresponding to the weight of the materials, i.e. to their grain size, occurs in which the fine grains fall on one side and the coarse grains on the other.

The coarse grains obtained in this way form an excellent starting material for the preparation of starch. The washing of the flour thus pre-treated proceeds much more quickly and the separation of the starch milk is performed much more smoothly. Not only is a higher yield of first-quality starch obtained, but the total yield is also greater. This arises because the wash water contains less light sediment, which is known to be difficult to extract and is therefore ordinarily abandoned. The fine grained material prepared by the pre-treatment of the flour according to the invention has particularly valuable baking properties, and as a consequence can be used for special purposes in the baking industry. The finest flours are very suitable, for example, for the preparation of biscuits to which they afford high brittleness and a flaky character. Such fine flours may also be used for the preparation of puff pastry.

The following example will serve to illustrate the invention and the advantages obtained thereby, but is not to be regarded as limiting the invention in any way:

*Example I*

100 kg. of wheat flour (ash content 800 mg. per 100 g.) is washed with water to produce a starch milk. The gross yield of starch is about 65 kg. By a prior separation of the finer suspended particles through centrifugal action there is obtained about 52 kg. of best quality starch, whereas the finer particles form about 13 kg. of second quality starch.

*Example II*

From a further quantity of the same wheat flour mass about 18 percent of the finest particles (those having a particle size of 25–35 microns) are removed by centrifugal separation. 100 kg. of such pre-treated flour is washed to yield about 66 kg. of commercial wheat flour starch. Due to centrifugal separation of the finer particles, however, 57 kg. of first quality starch are obtained. 9 kg. of second-quality starch may be had from the aforesaid fine particles which were centrifuged out from said mass.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

The process of producing starch substantially free from impurities and consisting only of relatively large grains of starch; comprising the steps of suspending cereal flour in air while centrifuging said cereal flour to remove small grains of starch in the order of 25–35 microns particle size and less, washing the residue of the centrifuged flour with water to obtain a dispersion of starch in water to form a raw starch milk, thereafter centrifuging said raw starch milk to separate relatively large grains from smaller grains of starch remaining in said raw starch milk, and finally drying said large grains of starch obtained from said raw starch milk.

References Cited in the file of this patent

UNITED STATES PATENTS

| | | |
|---|---|---|
| 643,323 | Duryea | Feb. 13, 1900 |
| 757,778 | Schrader | Apr. 19, 1904 |
| 994,497 | Berrigan | June 6, 1911 |
| 2,132,251 | Wagner | Oct. 4, 1938 |
| 2,310,651 | Peltzer et al. | Feb. 9, 1943 |
| 2,437,036 | Murer et al. | Mar. 2, 1948 |
| 2,453,310 | Edsall et al. | Nov. 9, 1948 |
| 2,543,281 | Ferrin | Feb. 27, 1951 |
| 2,772,990 | Hage | Dec. 4, 1956 |